United States Patent
Kuo

(10) Patent No.: US 7,866,972 B2
(45) Date of Patent: *Jan. 11, 2011

(54) REPLACEABLE DOUBLE-PLATE-INJECTION MOLD

(76) Inventor: Fei-Pin Kuo, 235 Chung-Ho Box 8-24, Taipei (TW)

( * ) Notice: Subject to any disclaimer, the term of this patent is extended or adjusted under 35 U.S.C. 154(b) by 533 days.

This patent is subject to a terminal disclaimer.

(21) Appl. No.: 11/923,674

(22) Filed: Oct. 25, 2007

(65) Prior Publication Data

US 2009/0110764 A1  Apr. 30, 2009

(51) Int. Cl.
*B29C 45/17* (2006.01)
(52) U.S. Cl. .................... 425/192 R; 425/185; 425/556
(58) Field of Classification Search ............... 425/185, 425/192 R, 556, 190, 195; 249/102
See application file for complete search history.

(56) References Cited

U.S. PATENT DOCUMENTS

| 4,861,254 A | * | 8/1989 | Takeuchi et al. | 425/190 |
| 5,916,603 A | * | 6/1999 | Pleasant et al. | 425/182 |
| 6,129,541 A | * | 10/2000 | Takeda | 425/564 |

* cited by examiner

*Primary Examiner*—Maria Veronica D Ewald
(74) *Attorney, Agent, or Firm*—Guice Patents PLLC

(57) ABSTRACT

A replaceable double-plate-injection mold comprises a movable side mold plate having one side formed with a male mold core; a movable side assembly plate being connected to another side of the movable side mold plate; a fixed side mold plate having one side being formed with a female mold core; and a fixed side assembly plate having one side installed with a plurality of track supporting rods for passing through the fixed side mold plate, the movable side mold plate, and the movable side assembly plate. One side of the fixed side assembly plate is recessed for assembling a supporting plate of the male mold core; and another side thereof is corresponding to the fixed side assembly plate. A center of the movable side mold plate is formed with a receiving portion.

15 Claims, 5 Drawing Sheets

REPLACEABLE DOUBLE-PLATE-INJECTION MOLD

FIELD OF THE INVENTION

The present invention relates to injection molding technologies, and particularly to a replaceable double-plate-injection mold, wherein in molding operation, it is only necessary to update a male mold core and a female mold core so that the operation is easy and cost is low.

BACKGROUND OF THE INVENTION

Referring to FIG. 5, the prior art injection mold includes a movable side mold plate (male mold plate) 10, a male mold core 20, a movable side assembly plate (mold seat) 30, a fixed side mold plate (female mold plate) 40, a female mold core 50 and a fixed side assembly plate 60. The movable side mold plate 10 is used integrally formed by metal line cutting and NC shaping. A center thereof is hollowed as a male mold core 20. The fixed side mold plate 40 and the female mold core 50 are made of the same way. The movable side mold plate 10 and the movable side mold plate 30 are fixed as a male mold block. Similarly, the fixed side mold plate 40 and the fixed side assembly plate 60 are fixed as a female mold block.

By above mentioned structure, in the relative equipment, the male mold block and the female mold block are arranged so that the male mold core 20 and the female mold core 50 are faced to one another. Thus the melt plastic material can be filled in the space formed by the male mold core 20 and female mold core 50. However, this assembly way is not an ideal one. If another product is to be made, it is necessary to update the whole mold. This is because for updating the male mold core 20 and female mold core 50, the movable side mold plate 10 and fixed side mold plate 40 are formed with a plurality of screw holes. For a long time, the screw holes are overlapped and then the fixed side mold plate 40 and movable side mold plate 10 destroy.

The prior art arrangement of the male mold block and female mold block causes that the product can be made quickly in mold injection. However, when another kind of product to be made, whole new male mold block and female mold block are necessary. If the kinds of the products are too many, a high cost is need in manufacturing. Furthermore the upper ejection plate, lower ejection plate, mold seat and mold plates occupy a large space. Thus, the prior art molding method is necessary to be improved.

SUMMARY OF THE INVENTION

Accordingly, the primary object of the present invention is to provide a replaceable double-plate-injection mold, in that the male mold core locked to the movable side mold plate and the female mold core locked to the fixed side mold plate can be updated and assembled easily. The upper ejection plate, lower ejection plate, mold seats and mold plates are not necessary to be renewed. Thus the cost and time are saved. Thus, in application, the user only needs to lock screws to the male mold core, supporting plate, movable side mold plate (male mold plate), female mold core, and fixed side mold plate (female mold plate). They can be updated and assembled easily and directly. Furthermore The upper ejection plate and the lower ejection plate are arranged between the upper supporting post and lower supporting post so that a left and a right edges of the supporting plate resists against the two spacing pads so that it can suffer from the pressure in molding injection.

To achieve above objects, the present invention provides a replaceable double-plate-injection mold, comprising: a movable side mold plate having one side formed with a male mold core; a movable side assembly plate being connected to another side of the movable side mold plate; a fixed side mold plate having one side being formed with a female mold core; and a fixed side assembly plate having one side installed with a plurality of track supporting rods for passing through the fixed side mold plate, the movable side mold plate, and the movable side assembly plate. One side of the fixed side assembly plate is recessed for assembling a supporting plate of the male mold core; and another side thereof is corresponding to the fixed side assembly plate. A center of the movable side mold plate is formed with a receiving portion. One side of the receiving portion is embedded by the male mold core and another side thereof is received with the supporting plate; one side of the supporting plate is installed with an upper ejection plate and a lower ejection plate; and one side of the movable side assembly plate is installed with two parallel and symmetrically arranged spacing pads; an upper supporting post and a lower supporting post are installed on the movable side assembly plate and are between the two spacing pads. The upper ejection plate and the lower ejection plate are arranged between the upper supporting post and lower supporting post so that a left and a right edges of the supporting plate resists against the two spacing pads.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
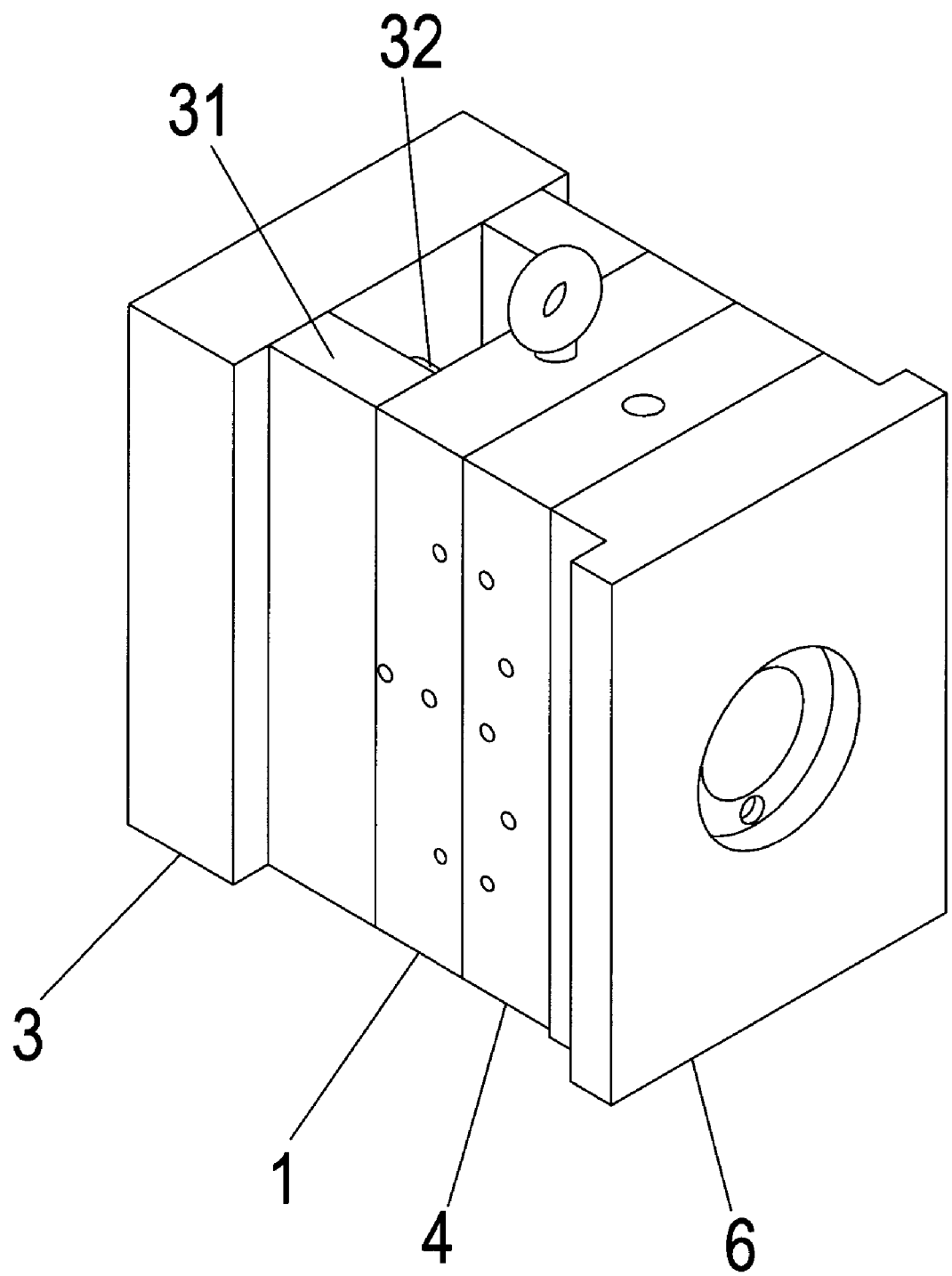
FIG. 1 is a schematic cross sectional view of the present invention.

With reference to FIG. 1, the schematic perspective view of the present invention is illustrated. The present invention is mainly formed by a fixed side assembly plate 6, a fixed side mold plate (female mold plate) 4, a movable side mold plate (male mold plate) 1, and a movable side assembly plate (mold seat) 3. One side of the movable side assembly plate 3 is installed with two spacing pads 31 which are symmetrically arranged. A center of the two spacing pads 31 is formed with an upper supporting post 32 and a lower supporting post 33 (referring to FIG. 2). The spacing pads 31 serves to resist against the movable side mold plate 1.

Figure 2:
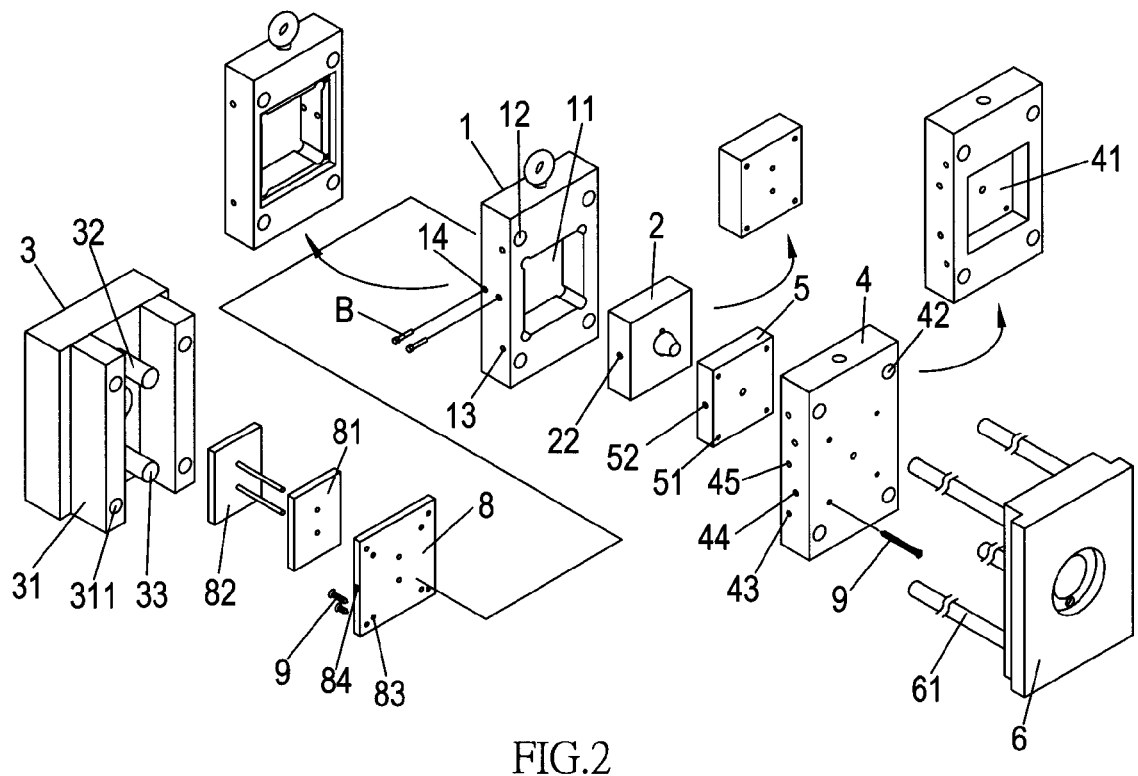
FIG. 2 is an exploded schematic view of FIG. 1.

Referring to FIG. 2, an exploded perspective view according to FIG. 1 is illustrated. A center portion of the movable side mold plate 1 is formed with a receiving portion 11 which is useful in the line cutting process or NC shaping process.

Two sides of the receiving portion 11 are installed with a male mold core 2 and a supporting plate 8, respectively. A front side of the supporting plate 8 is installed with an upper ejection plate 81 and a lower ejection plate 82.

An edge of the movable side mold plate 1 is formed with a plurality of penetrating holes 12. A plurality of track supporting rods 61 pass through the penetrating holes 12. A lateral side of the movable side mold plate 1 is formed with a water hole 13 and/or insertion holes 14 for receiving pins B.

Besides, the movable side assembly plate 3 has a surface having the two parallel spacing pads 31. Each of an upper side and a lower side of each spacing pad 31 is formed with a through hole 311 for receiving a track supporting rod 61. The movable side assembly plate 3 is formed with the upper supporting post 32 and the lower supporting post 33 between the two spacing pads 31. The upper ejection plate 81 and lower ejection plate 82 are installed between the upper supporting post 32 and lower supporting post 33 so that the right and left edges of the supporting plate 8 can resist against respective spacing pads 31 in the molding injection process.

Besides, a male mold core 2 is assembled to the supporting plate 8 by using a plurality of screws 9 and it reduces into the receiving portion 11. For example, a plurality of screws 9 are screwed to the screw holes 83 of the supporting plate 8 to the edges of the male mold core 2. Or the pins B are inserted into the insertion holes 14 of the movable side mold plate 1 so as to fix the supporting plate 8 and the male mold core 2. Thus, the pins B are inserted to the insertion holes 14, and then to the insertion holes 84 and insertion holes 22.

Besides, the edges of the fixed side mold plate 4 are formed with a plurality of penetrating holes 42 for receiving the plurality of track supporting rods 61. The lateral side of the fixed side mold plate 4 is formed with a water hole 43, a temperature sensor receiving hole 44 and/or insertion holes 45 for receiving pins B.

A center of the fixed side mold plate 4 is a supporting portion 41. One side of the supporting portion 41 has a recess for embedding a female mold core 5 and another side thereof is corresponding to the fixed side assembly plate 6.

Besides, a plurality of screws are used to lock the supporting portion 41 of the fixed side mold plate 4 to the screw holes at edges of the female mold core 5. Or pins B are inserted into the insertion holes 45 at the lateral sides of the fixed side mold plate 4 and then to the insertion holes 52 of the female mold core 5.

Besides, a plurality of screws 9 are used to retain the supporting plate 8 which is completely reduced into the receiving portion 11 so as to flush therewith.

Figure 3:
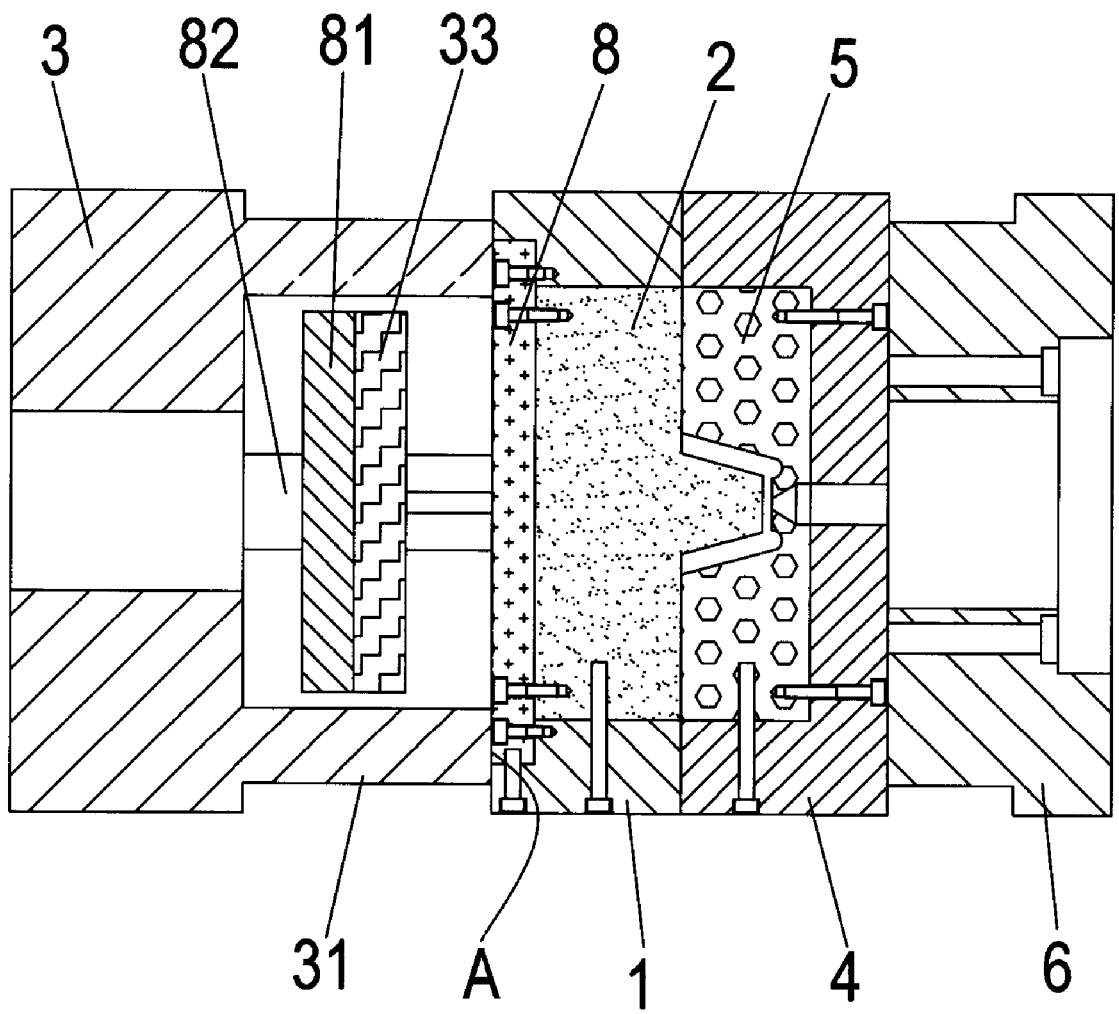
FIG. 3 is a cross sectional view showing that the supporting plate resists against the spacing pads.

With reference to FIG. 3, it is illustrated that the width between the two spacing pads 31 is smaller than a width of the supporting plate 8 so that in molding injection, the contact surface A of the supporting plate 8 can resist against the upper supporting post 32 and lower supporting post 33.

Figure 4:
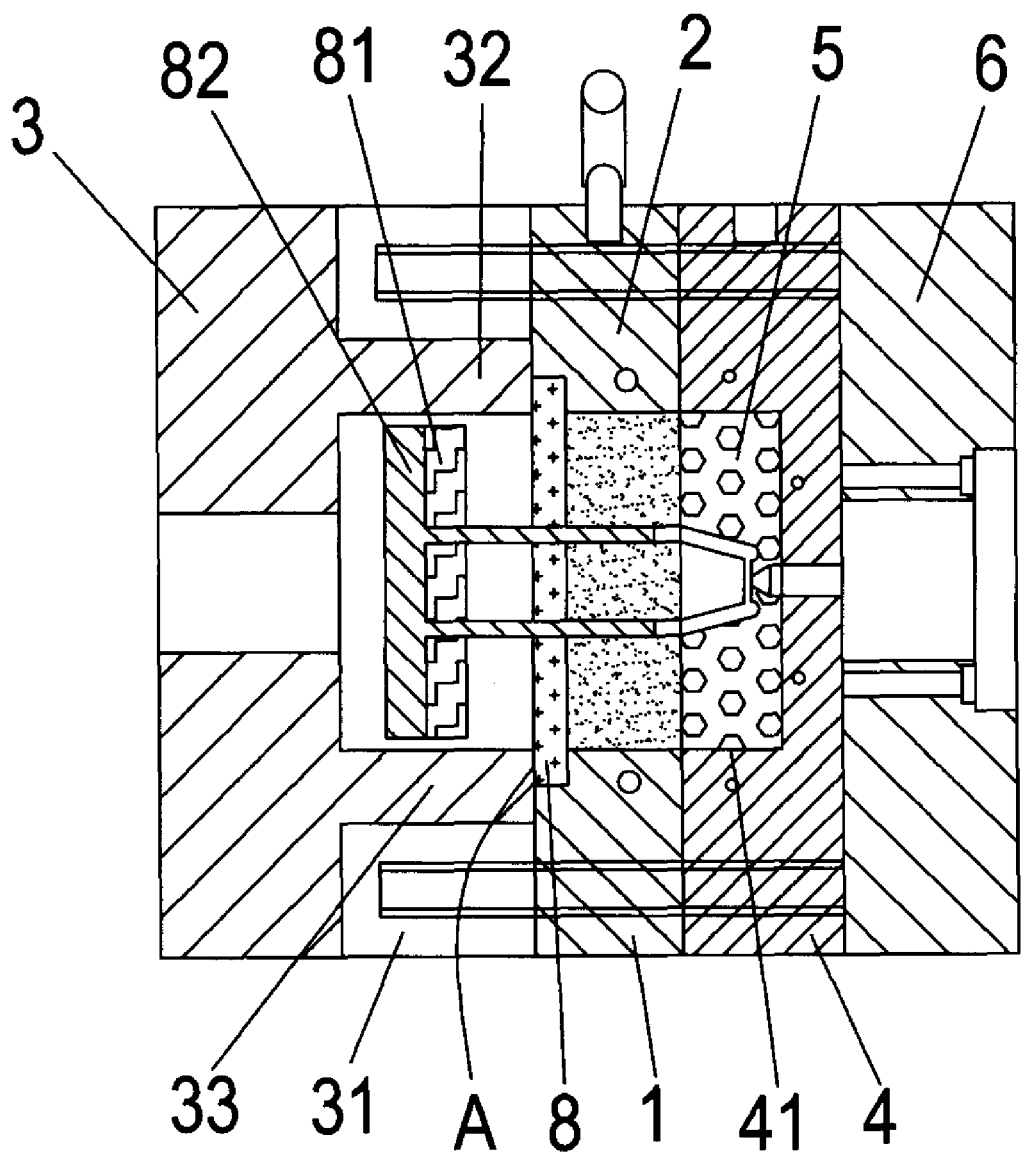
FIG. 4 is a longitudinal cross sectional view of FIG. 1.
Figure 5:
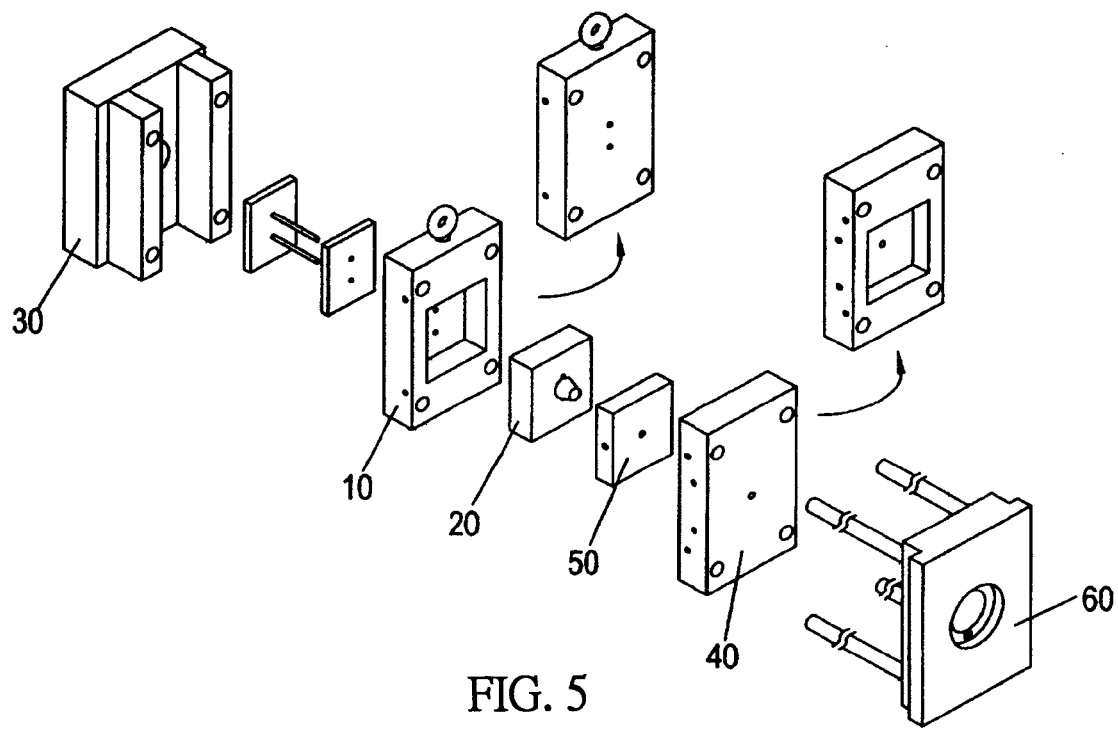
FIG. 5 is an exploded schematic view showing the prior art injection molding.

Referring to FIG. 4, it is illustrated that it is preferable that the hardness of the movable side mold plate 1 and the fixed side mold plate 4 is between 20 kg/cm$^2$~200 kg/cm$^2$ so that the contact surface A can suffer from the pressure in molding injection. Besides, the female mold core 5 is installed in the supporting portion 41 of the fixed side mold plate 4.

From above discussion, it is known that under the present invention, the original injection mold and related devices are unchanged, it is only necessary to prepare different kinds of male mold core and female mold core for assembly. Meanwhile, the space for storing the upper ejection plate, lower ejection plate, mold seat and mold plate is saved. Furthermore the cost for reforming the mold is also saved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A replaceable double-plate-injection mold comprising:
   a movable side mold plate having a first side formed to accommodate a male mold core;
   a movable side assembly plate connected to a second side of the movable side mold plate;
   a fixed side mold plate having a first side formed for accommodating a female mold core; and
   a fixed side assembly plate having a plurality of track supporting rods extending from a first side thereof, the plurality of track supporting rods being inserted through holes located in the fixed side mold plate, holes located in the movable side mold plate, and holes located in the movable side assembly plate;
   the first side of the fixed side mold plate is recessed for insertion of the female mole core and a second side of the fixed side mold plate has a supporting portion; and the second side of the fixed side mold plate engaging the fixed side assembly plate;
   the movable side mold plate has a receiving portion located in a center thereof; the male mold core is inserted into a first side of the receiving portion located on the first side of the movable side mold plate and a supporting plate is inserted into a second side of the receiving portion located on the second side of the movable side mold plate; a first side of the supporting plate engaging the male mold core, a second side of the supporting plate is connected to an upper ejection plate and a lower ejection plate; and
   the movable side assembly plate has two spacing pads extending parallel and being symmetrically located on a first side thereof, the movable side assembly plate has an upper supporting post and a lower supporting post located on the first side thereof and located the two spacing pads, the upper ejection plate and the lower ejection plate are located between the upper supporting post and lower supporting post, a left and a right edge of the supporting plate engaging the two spacing pads.

2. The replaceable double-plate-injection mold as claimed in claim 1, wherein a plurality of screws are used to connect the supporting plate to the movable side mold plate, a second side of the supporting plate being flush with the second side of the movable side mold plate.

3. The replaceable double-plate-injection mold as claimed in claim 2, wherein the movable side mold plate has at least one insertion hole, the supporting plate has at least one insertion hole, a receiving pin is inserted through the at least one insertion hole of the movable side mold plate and inserted into the at least one insertion hole of the supporting plate thereby connecting the supporting plate to the movable side mold plate.

4. The replaceable double-plate-injection mold as claimed in claim 1, wherein the movable side mold plate has at least one insertion hole, the supporting plate has at least one insertion hole, a receiving pin is inserted through the at least one insertion hole of the movable side mold plate and inserted into the at least one insertion hole of the supporting plate thereby connecting the supporting plate to the movable side mold plate.

5. The replaceable double-plate-injection mold as claimed in claim 1, wherein a plurality of screws are used to connect the supporting plate to the movable side mold plate and the male mold core.

6. The replaceable double-plate-injection mold as claimed in claim 5, wherein the movable side mold plate has a plurality of insertion holes, the supporting plate has at least one insertion hole, the male die mold has at least one insertion hole, a plurality of receiving pins are respectively inserted through the plurality of insertion holes of the movable side mold plate and respectively inserted into the at least one insertion hole of the supporting plate and the at least one insertion hole of the male die mold thereby connecting the supporting plate and the male mold core to the movable side mold plate.

7. The replaceable double-plate-injection mold as claimed in claim 1, wherein the movable side mold plate has a plurality of insertion holes, the supporting plate has at least one insertion hole, the male die mold has at least one insertion hole, a plurality of receiving pins are respectively inserted through the plurality of insertion holes of the movable side mold plate and respectively inserted into the at least one insertion hole of the supporting plate and the at least one insertion hole of the male die mold thereby connecting the supporting plate and the male mold core to the movable side mold plate.

8. The replaceable double-plate-injection mold as claimed in claim 1, wherein the female mold core is connected to the supporting plate by using supporting portion of the fixed side mold plate by a plurality of screws.

9. The replaceable double-plate-injection mold as claimed in claim 1, wherein a width between the two spacing pads is smaller than a width of the supporting plate so that in molding injection, a contact surface of the supporting plate can resist against the upper supporting post and lower supporting post.

10. The replaceable double-plate-injection mold as claimed in claim 1, wherein a hardness of the movable side mold plate and the fixed side mold plate is between 20 kg/cm2~200 kg/cm2 so that a contact surface of the supporting plate can suffer from the pressure in molding injection.

11. The replaceable double-plate-injection mold as claimed in claim 1, wherein a lateral side of the fixed side mold plate is formed with a plurality of penetrating holes for respectively receiving the plurality of track supporting rods.

12. The replaceable double-plate-injection mold as claimed in claim 1, wherein a lateral side of the movable side mold plate is formed with a plurality of penetrating holes for receiving a plurality of track supporting rods.

13. The replaceable double-plate-injection mold as claimed in claim 1, wherein each of an upper and a lower end of each spacing pad is formed with a through hole for receiving a respective track supporting rod of the plurality of track supporting rods.

14. The replaceable double-plate-injection mold as claimed in claim 1, wherein a lateral side of the fixed side mold plate is formed with at least one hole selected from a group of holes consisting of a water hole, a temperature sensor receiving hole and insertion holes for receiving pins.

15. The replaceable double-plate-injection mold as claimed in claim 1, wherein a lateral side of the movable side mold plate is formed with a holes selected from a group of holes consisting of water holes and insertion holes for receiving pins.

* * * * *